US011416709B2

(12) United States Patent
Huang et al.

(10) Patent No.: US 11,416,709 B2
(45) Date of Patent: Aug. 16, 2022

(54) METHOD, APPARATUS, DEVICE AND COMPUTER READABLE MEDIUM FOR GENERATING VQA TRAINING DATA

(71) Applicant: BEIJING BAIDU NETCOM SCIENCE AND TECHNOLOGY CO., LTD., Beijing (CN)

(72) Inventors: Pingping Huang, Beijing (CN); Min Qiao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 504 days.

(21) Appl. No.: 16/546,602

(22) Filed: Aug. 21, 2019

(65) Prior Publication Data

US 2020/0104638 A1 Apr. 2, 2020

(30) Foreign Application Priority Data

Sep. 28, 2018 (CN) .......................... 201811142228.9

(51) Int. Cl.
*G06K 9/62* (2022.01)
*G06F 40/247* (2020.01)
*G06F 40/30* (2020.01)

(52) U.S. Cl.
CPC ......... *G06K 9/6257* (2013.01); *G06F 40/247* (2020.01); *G06F 40/30* (2020.01); *G06K 9/6263* (2013.01)

(58) Field of Classification Search
None
See application file for complete search history.

(56) References Cited

U.S. PATENT DOCUMENTS 8,666,730 B2 3/2014 Todhunter
2016/0140214 A1 5/2016 Musuluri

FOREIGN PATENT DOCUMENTS

| CN | 104991955 A | 10/2015 |
|----|-------------|---------|
| CN | 105677783 A | 6/2016 |
| CN | 105930452 A | 9/2016 |
| CN | 107315766 A | 11/2017 |

(Continued)

OTHER PUBLICATIONS

Kafle, Kushal, Mohammed A. Yousefhussien, and Christopher Kanan. "Data Augmentation for Visual Question Answering." In INLG, pp. 198-202. 2017. (Year: 2017).*

(Continued)

*Primary Examiner* — David Perlman
(74) *Attorney, Agent, or Firm* — Fay, Sharpe LLP

(57) ABSTRACT

Embodiments of the present disclosure relate to a method, an apparatus, a device and a computer readable medium for generating VQA training data. The method comprises: obtaining a first group of training data of the VQA system, the first group of training data including a first question for an image in the VQA system and a first answer corresponding to the first question; determining a second question associated with the first question in term of semantic; and determining a second answer corresponding to the second question based on the first question and the first answer, to obtain a second group of training data for the image in the VQA system, the second group of training data including the second question and the second answer.

17 Claims, 4 Drawing Sheets

(56) References Cited

FOREIGN PATENT DOCUMENTS

| CN | 108090169 A | 5/2018 |
|----|-------------|--------|
| JP | 2007207127 A | 8/2007 |
| JP | 2017091525 A | 5/2017 |
| KR | 1020170043582 A | 4/2017 |
| KR | 1020180048624 A | 5/2018 |

OTHER PUBLICATIONS

Extended European Search Report for European Application No. 19191466.2, dated Nov. 7, 2019, 8 pages.
Office Action for Japanese Application No. 2019119767, dated Aug. 18, 2020, 6 pages.
Issey Masuda Mora et al., "Towards Automatic Generation of Question Answer Pairs From Images", Universitat Plitecnica de Catalunya, Barcelona, Catalonia/Spain, 2 pages.
Office Action for Chinese Application No. 201811142228.9, dated Oct. 12, 2020, 17 pages.
Notice of Allowance for Chinese Application No. 201811142228.9, dated May 20, 2021, 4 pages.
Office Action for Korean Application No. 10-2019-0109834, dated Apr. 22, 2021, 6 pages.
Dongchen Yu et al., "Structured Semantic Representation for Visual Question Answering", Dept. of Electronic Engineering, Shanghai Jiao Tong University, Shanghai 200240, China, pp. 2286-2290.
"A review of neural network-based visual question-and-answer technology research", Jan. 31, 2018, 7 pages. (English Abstract).

\* cited by examiner

METHOD, APPARATUS, DEVICE AND COMPUTER READABLE MEDIUM FOR GENERATING VQA TRAINING DATA

CROSS REFERENCE TO RELATED APPLICATION

This application claims priority under 35 U.S.C. § 119(a) on Chinese Patent Application No. 201811142228.9, filed with the State Intellectual Property Office of P. R. China on Sep. 28, 2018, the entire contents of which are incorporated herein by reference.

FIELD OF THE INVENTION

Embodiments in the present disclosure relate to a field of computers, and more particularly relate to a method, an apparatus, an electronic device and a computer readable storage medium for generating training data in a Visual Question Answering (VQA) system.

RELATED ART

A VQA system relates to several technical fields, such as computer vision, natural language processing and knowledge representation, and becomes a hotspot of the research on artificial intelligence. In the VQA system, an image is given. Questions about the given image are required to be answered. That is, it is required to input the image and the questions, to combine the two pieces of information, and to generate a piece of human language as an output. A conventional VQA system is implemented based on a supervised machine learning method, learning how to answer questions based on contents of images by using examples including a large number of images and questions and answers about those images as training data. Effect of such a method relies directly on the amount of the training data.

Presently, training data are typically obtained via manual labeling. For example, for a given input image, a labeling person raises a question about the image, and labels a corresponding answer. Such a method has drawbacks of a high cost, a slow speed, and a limited amount of training data. It is demanded to provide an improved scheme to obtain training data so as to improve the effects of model training, thereby improving the accuracy of the VQA system.

SUMMARY OF THE INVENTION

According to exemplary embodiments of the present disclosure, an improved scheme for generating training data is provided.

In a first aspect of the present disclosure, a method for generating training data in a VQA system is provided, comprising: obtaining a first group of training data of the VQA system, the first group of training data including a first question for an image in the VQA system and a first answer corresponding to the first question; determining a second question associated with the first question in term of semantic; and determining a second answer corresponding to the second question based on the first question and the first answer, to obtain a second group of training data for the image in the VQA system, the second group of training data including the second question and the second answer.

In a second aspect of the present disclosure, an apparatus for generating training data in a VQA system is provided, comprising: an obtaining unit configured to obtain a first group of training data of the VQA system, the first group of training data including a first question for an image in the VQA system and a first answer corresponding to the first question; a question determination unit configured to determine a second question associated with the first question in term of semantic; and an answer determination unit configured to determine a second answer corresponding to the second question based on the first question and the first answer, to obtain a second group of training data for the image in the VQA system.

In a third aspect of the present disclosure, an electronic device is provided, comprises: one or more processors; and a storage device configured to store one or more programs. When the one or more programs are executed by the one or more processors, the one or more programs enable the one or more processors to implement the method according to the first aspect of the present disclosure.

In a fourth aspect of the present disclosure, a computer readable storage medium having a computer program stored thereon. When the program is executed by a processor, the program implements the method according to the first aspect of the present disclosure.

It should be understood that the above description in the summary of the invention are not to limit essential or important features of embodiments in the present disclosure, and not to limit the scope of the present disclosure. Other features of the present disclosure would become easy to understand from the following description.

BRIEF DESCRIPTION OF THE DRAWINGS

Above-mentioned and other features, advantages and aspects of respective embodiments of the present disclosure will be apparent from the detailed description which follows, taken in conjunction with the accompanying drawings. In the drawings, identical or like reference numbers indicates identical or like elements, wherein.

DETAILED DESCRIPTION

Figure 1:
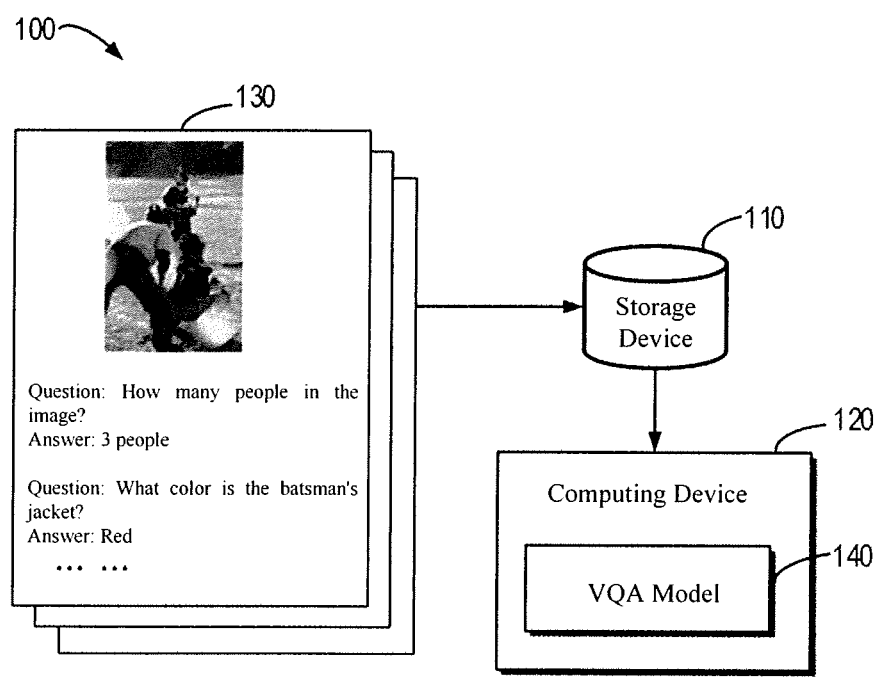
FIG. 1 illustrates a schematic diagram showing an exemplar environment in which the embodiments of the present disclosure may be implemented.

Embodiments of the present disclosure will be described in more detail with reference to drawings below. Although some embodiments of the present disclosure are illustrated in the drawings, it should be understood that the present disclosure may be implemented in various embodiments, and should not be interpreted as being limited to those embodiments set fourth here. In contrary, those embodiments are provided for facilitating thorough and complete understanding of the present disclosure. It should also be understood that the drawings and embodiments of the present disclosure are only illustrative, and are not intent to limit protection extent of the present disclosure.

In the description of the embodiments of the present disclosure, terminology "comprise", "include" or the like should be interpreted with open meanings, namely, "include, but not limited to". Terminology "based on" should be interpreted as "at least partially based on". Terminology "an embodiment" or "the embodiment" should be interpreted as "at least one embodiment". Terminology "first", "second" or the like may refer to different objects or the same object. Following description may involve other definite and implicit definitions.

Embodiments of the present disclosure will be described in detail with reference to drawings below.

FIG. 1 illustrates a schematic diagram showing an exemplary environment 100 in which the embodiments of the present disclosure may be implemented. The exemplar environment 100 illustrates a model training process in a VQA system. As shown in FIG. 1, the exemplary environment 100 may include a storage device 110 and a computing device 120. The storage device 110 may be configured to store training data 130 for the VQA system. It should be understood that the storage device 110 may be implemented as any storage devices that have been known in the art or will be developed in the future. The computing device 120 may be implemented as a server or a client device supporting the VQA model 140, such as a search engine server, a database server, a computing cluster or the like. The computing device 120 may obtain the training data 130 from the storage device 110 for training the VQA model. The training data 130 may include a set of images, questions for the images, and answers corresponding to the questions. It should be understood that FIG. 1 is only illustrative, and the present application is not limited thereto. Actually, the embodiments of the present disclosure may be applicable to any cases for training the VQA system models.

As mentioned above, the training data 130 is determined by manual labeling conventionally. Such a conventional method has drawbacks of a high cost, a slow speed, and a limited amount of training data. In view of this, a basic idea of the present application is to extend training data according to semantics automatically by means of computer implementations, based on existing training data. Accordingly, the training data may be obtained automatically and efficiently, at a low cost, which may increase amount of training data significantly, and may improve accuracy of the VQA system model.

Figure 2:
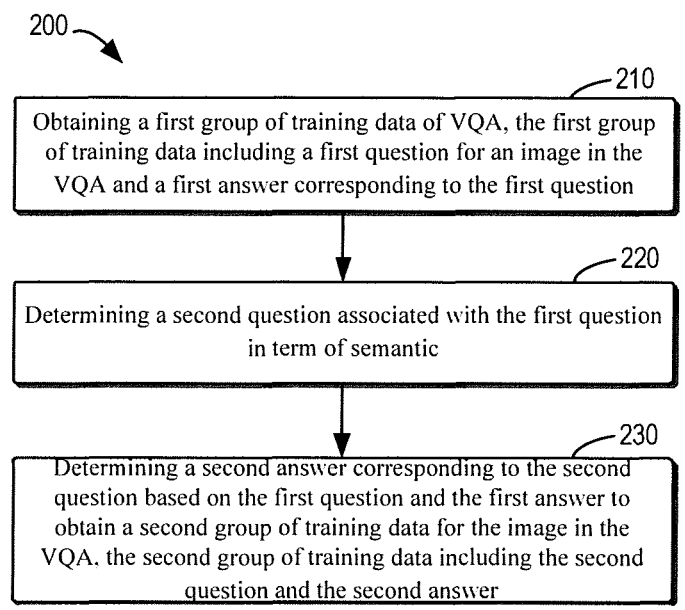
FIG. 2 illustrates a flow chart of a method for generating training data in a VQA system according to an embodiment of the present disclosure.

An exemplary implementation of a scheme for generating training data in a VQA system according to an embodiment of the present disclosure will be described in more detail in combination with FIGS. 2 and 3 below. FIG. 2 illustrates a flow chart of a method 200 for generating training data in a VQA system according to an embodiment of the present disclosure. The method 200 may be implemented, for example, in the computing device 120 as shown in FIG. 1. It should be understood that the method 200 may alternatively be implemented in other computing devices separated from the computing device 120 supporting the VQA model 140. In other words, the generation of the training data may be implemented separately from the training of the VQA model.

As show in FIG. 2, at block 210, a first group of training data of the VQA system may be obtained. According to embodiments of the present disclosure, the first group of training data may include a first question for an image in the VQA system and a first answer corresponding to the first question. Returning to FIG. 1, as indicated by the training data 130, at least one question and an answer corresponding to the question may be included for each image in the VQA system. According to some embodiments of the present disclosure, the image may be in a form of picture. In alternative embodiments, the image may be a frame in video data.

According to some embodiments of the present disclosure, the first group of training data may be obtained from a set of existing training data that has been obtained for the VQA system by manual labeling. In alternative embodiments, the first group of training data may be obtained from a set of existing training data that has been obtained for the VQA system by means of computer implementations. With the schemes in the embodiments of the present disclosure, the set of existing training data may be extended automatically, which may improve amount of the training data, and may enhance training effects of the VQA system model.

Referring again to FIG. 2, at block 220, a second question associated with the first question in term of semantic may be determined. According to the embodiments of the present disclosure, the second question may be established based on the first question by utilizing semantic analysis. In some embodiments, a keyword in the first question may be determined based on the semantic analysis. Then, an extended word associated with the keyword in term of semantic may be determined. Then, a second question is established based on the extended word. It should be understood that, in the embodiments of the present disclosure, the semantic analysis may be implemented based on any semantic analyzing algorithms for natural languages that have been known in the art or will be developed in the future. Additionally, the questions and answers in the embodiments of the present disclosure may be expressed in any natural languages. Examples of the natural language include, but not limited to, Chinese, English, German, Spanish, French, or the like. In the following description, Chinese and English will be taken as examples of the natural languages. However, it should be understood that those languages are only illustrative, and are not intent to limit the present disclosure. The embodiments of the present disclosure may be applicable to various kinds of different natural languages.

According to some embodiments of the present disclosure, the keyword in the first question may be determined based on the type of the first question, such as the sentence pattern, the sentence form, etc., to facilitate establishment of subsequent second questions. An exemplary implementation of a scheme for establishing the second question according to an embodiment of the present disclosure will be described in detail in combination with FIG. 3 below. FIG. 3 illustrates a flow chart of a method 300 for determining the second question according to the embodiment of the present disclosure. Like the method 200, the method 300 may be implemented, for example, in the computing device 120 as shown in FIG. 1, but may also be implemented in other computing devices separated from the computing device 120 supporting the VQA model 140.

Figure 3:
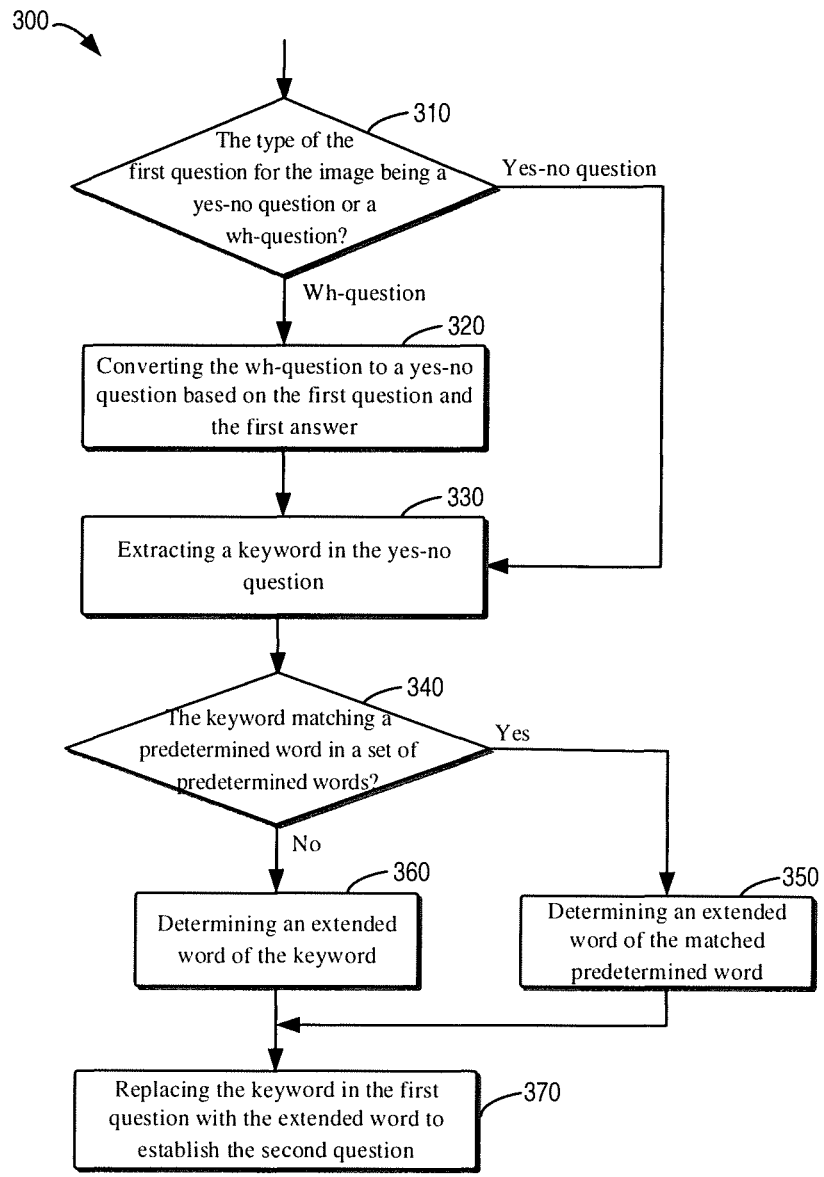
FIG. 3 illustrates a flow chart of a method for determining a second question according to an embodiment of the present disclosure.

As show in FIG. 3, after obtaining the first group of training data for the image in the VQA system (e.g., at block 210 of FIG. 2), at block 310, it is determined whether the type of the first question for the image is a yes-no question or a wh-question. The yes-no question refers to a question to be answered with "yes" or "no" or similar words. The wh-question refers to a question containing a question word. More generally speaking, the wh-questions are questions other than those yes-no questions.

According to some embodiments of the present disclosure, the type of the first question may be determined as a yes-no question or a wh-question by matching the first question with a set of special question words. If the matching fails, it is determined that the type of the first question is a yes-no question. On the other hand, if the matching successes, it is determined that the type of the first question is a wh-question. According to the embodiments of the present disclosure, the set of special question words may include, but be limited to, "why", "who", "how", "what", "when", "how many/how much".

In alternative embodiments, the type of the first question may be determined as a yes-no question or a wh-question based on the type of the first answer. For example, if the type of the first answer is a positive answer or a negative answer, it is determined that the type of the first question is the yes-no question. On the other hand, if the type of the first answer is neither a positive answer nor a negative answer, it is determined that the type of the first question is the wh-question. It should be understood that the type of the first question may be determined in any other appropriate manners, and is not limited to the above examples.

If it is determined that the type of the first question is a wh-question at block 310, the process proceeds to block 320. At block 320, the wh-question is converted to a yes-no question based on the first question and the first answer. For example, as illustrated at 130 in FIG. 1, the question is: "How many people in the image?". The answer is: "3 people". The question contains "how many". Therefore, it is a wh-question. Accordingly, it may be converted to a yes-no question: "is there 3 people in the image?". It should be understood that the conversion of the questions may be implemented according to any appropriate syntax analyzing technology, detailed description of which will be omitted here to avoid confusing the present invention unnecessarily.

At block 330, a keyword is extracted from the converted yes-no question. According to some embodiments of the present disclosure, the keyword may be one or more of the subject, the object or the like of the question. According to the embodiments of the present disclosure, the keyword may be extracted according to any segmentation algorithms that have been known in the art or are applicable, detailed description of which will be omitted here to avoid confusing the present invention unnecessarily.

For example, in the above example, the converted yes-no question is: "is there 3 people in the image?"

If it is determined that the type of the first question is a yes-no question at block 310, the process proceeds to block 330, to extract a keyword.

At block 340, it is determined whether the keyword matches a predetermined word in a set of predetermined words. According to the embodiments of the present disclosure, the set of predetermined words may include at least one of: numbers, letters and characters.

If it is determined that the keyword matches a predetermined word in the set of predetermined words at block 340, an extended word of the matched predetermined word may be determined based on semantic analysis. According to the embodiments of the present disclosure, extended words of a number may include one or more numbers other than the number. According to embodiments of the present disclosure, extended words of a letter may include one or more letters other than the letter. According to embodiments of the present disclosure, extended words of a character may include one or more characters other than the character. According to the embodiments of the present disclosure, the number or type of the extended words may be determined according to experiences or as necessary.

For example, in the above example, the converted yes-no question is: "Is there 3 people in the image?", in which the keyword is "3". Then, it may be determined that the keyword matches a number in the set of predetermine words. Thus, it may be determined that the extended word of the keyword may be a number other than "3", such as, 1, 4, or 6. It should be understood that the number described here is only illustrative. In other embodiments, any other numbers may be used.

If it is determined that the keyword does not match any predetermine words in the set of predetermine words at block 340, the process proceeds to block 360, to determine an extended word of the keyword based on semantic analysis. According to the embodiments of the present disclosure, the extended word may include at least one of: an antonym, a synonym, a super-ordinate and a hyponym. The following table 1 shows some examples of semantic relationship.

TABLE 1

| Semantic relationship | Examples |
| --- | --- |
| Antonym | (turn on, turn off), (finny day, rainy day) |
| Super-ordinate and hyponym | (red, color), (blue, color), (yellow, color) (motorcycle, vehicle), (automobile, vehicle), (bicycle, vehicle) |

In some embodiments of the present disclosure, the extended word of the keyword may be determined by means of a semantic lexicon or a semantic dictionary. The semantic lexicon or the semantic dictionary may be obtained by any related techniques that have been known in the art or will be developed in the future, and the embodiments of present application are not limited thereto. According to the embodiments of the present disclosure, the number or type of the extended words may be determined according to experiences or requirements.

For example, as shown at 130 in FIG. 1, the question is: "What color is the batsman's jacket?". The answer is: "Red". By matching with the set of special question words, it is determined that the question is a wh-question. The converted yes-no question is "Is the color of the batsmen's jacket red?". A keyword "red" may be extracted therefrom. Considering that red, blue, yellow are all the hyponyms of color, it is determined that, for example, "blue" is an extended word of the keyword "red". It should be understood that the embodiments of the present application are not limited thereto, and may include various kinds of other examples, which will not be described here in detail for the sake of concision.

After the extended word is determined at block 350 or 360, the process proceeds to block 370, to replace the keyword in the first question with the extended word. In this way, the second question is established based on the first question. For example, in the previous example, a new question "Is there one people in the image?" may be established based on the question "How many people in the image?" and the answer "3 people", by replacing with the extended word. For example, a new question "Is the color of the batsmen's jacket blue?" may be established based on the question "Is the color of the batsmen's jacket red?".

Referring back to FIG. 2, after the second question is established, the process proceeds to block 230, to determine a second answer corresponding to the second question based on the first question and the first answer, so as to obtain a second group of training data for the image in the VQA system. The second group of training data includes the second question and the second answer. According to some embodiments of the present disclosure, the second answer may be determined based on a logical relationship between the first question and the first answer, and a semantic relationship between the first question and the second question. It should be understood that the second answer may be determined based on the first question, the first answer and the second question in other reasoning manners, without limited to the embodiments of the present disclosure.

For example, in the previous example, a new answer "No" may be obtained by means of logical reasoning based on the question "How many people in the image?", the answer "3 people", and the established question "Is there one people in the image?". Therefore, a second group of training data including the question "Is there one people in the image?" and the answer "No" is established.

For example, a new answer "No" may be obtained by means of logical reasoning based on the question "What color is the batsmen's jacket?", the answer "Red", and the established question "Is the color of the batsmen's jacket blue?". Therefore, a second group of training data including the question "Is the color of the batsmen's jacket blue?" and the answer "No" is established. The above logical reasoning may be implemented by means of any relationship reasoning algorithms that have been known in the art or will be developed in the future, which will not be described in detail here, to avoid confusing the present invention unnecessarily.

So far, the method for generating training data in the VQA system according to the embodiment of the present disclosure has been described with reference to FIGS. 2 and 3. According to the embodiments of the present disclosure, the training data of the VQA system may be generated by means of a computer-implemented method. Therefore, as compared with the conventional manual labeling method, the training data may be generated locally and automatically at a low cost, which improves operational efficiency. Additionally, according to the embodiments of the present disclosure, the training data may be extended based on existing training data for VQA by using a semantic knowledge library, which may greatly increase the amount of the training data, thereby improving accuracy for training the VQA system model.

Figure 4:
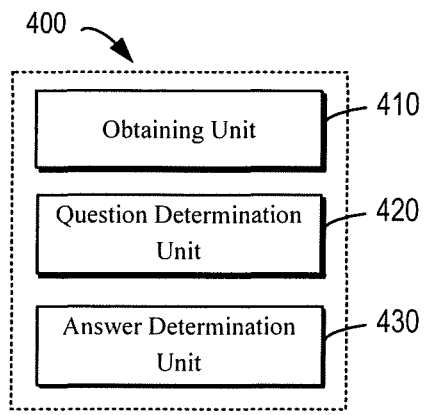
FIG. 4 illustrates a schematic diagram showing an apparatus for generating training data in a VQA system according to an embodiment of the present disclosure.

The embodiments of the present disclosure also provide an apparatus for implementing the above method or process. FIG. 4 illustrates a schematic diagram showing an apparatus 400 for generating the training data in the VQA system according to an embodiment of the present disclosure. The apparatus 400 may be implemented in the computing device 120 shown in FIG. 1, for example. As shown in FIG. 4, the apparatus 400 may comprise an obtaining unit 410, a question determination unit 420 and an answer determination unit 430.

In some embodiments, the obtaining unit 410 may be configured to obtain a first group of training data of the VQA system, the first group of training data including a first question for an image in the VQA system and a first answer corresponding to the first question. According to the embodiments of the present disclosure, the obtaining unit 410 may obtain the first group of training data from a set of existing training data that has been obtained for the VQA system by manual labeling.

In some embodiments, the question determination unit 420 may be configured to determine a second question associated with the first question in term of semantic. According to some embodiments of the present disclosure, the question determination unit 420 may include (not shown): a keyword determination unit configured to determine a keyword in the first question based on the type of the first question; an extended-word determination unit configured to determine an extended word associated with the keyword based on semantic analysis; and an establishing unit configured to establish the second question based on the extended word.

In some embodiments, the keyword determination unit may include: an extraction unit configured, in response to the type of the first question being a yes-no question, to extract the keyword from the yes-no question; and a conversion unit configured, in response to the type of the first question being a wh-question, to convert the wh-question to a yes-no question based on the first question and the first answer, and to extract the keyword from the converted yes-no question.

In some embodiments, the extended-word determination unit may include: a matching unit configured, in response to the keyword matched with a predetermine word in a set of predetermine words, to determine an extended word of the matched predetermine word based on semantic analysis; and in response to the keyword matched with none of the predetermine words in the set of predetermine words, to determine an extended word of the keyword.

In some embodiments, the set of predetermine words may include at least one of: numbers, letters and characters. In some embodiments, the extended word may include at least one of: an antonym, a synonym, a super-ordinate and a hyponym.

In some embodiments, the establishing unit may replace the keyword in the first question with the extended word, to establish the second question.

In some embodiments, the answer determination unit 430 may determine the second answer based on a logical relationship between the first question and the first answer, and a semantic relationship between the first question and the second question.

It should be understood that each component in the apparatus 400 may correspond to respective step in the methods 200 and 300 described with reference to FIGS. 2 and 3. Further, operations and characteristics of the apparatus 400 and the components therein may correspond to those operations and characteristics described above in combination with FIGS. 2 and 3, and may achieve the same effects, details of which will not be repeated here.

The components included in the apparatus 400 may be is implemented in various ways, including software, hardware, firmware or any combinations thereof. In some embodiments, one or more components may be is implemented in software and/or firmware, such as machine executable instructions stored on a storage medium. In addition to or replacing the machine executable instructions, part or all of the components in the apparatus 400 may be is implemented at least partially by one or more hardware logic components. For example, but not being limitative, exemplary types of hardware logic components that may be used include: a field programmable gate array (FPGA), an application specific integrated circuit (ASIC), an application specific standard product (ASSP), a system on chip (SOC), a complex programmable logic device (CPLD) or the like.

The components shown in FIG. 4 may be partially or entirely implemented as hardware modules, software modules, firmware modules or any combinations thereof. Particularly, in some embodiments, the flow chart, method or process described above may be is implemented by a storage system, or a host corresponding to the memory system, or hardware in other computing device independent of the storage system.

Figure 5:
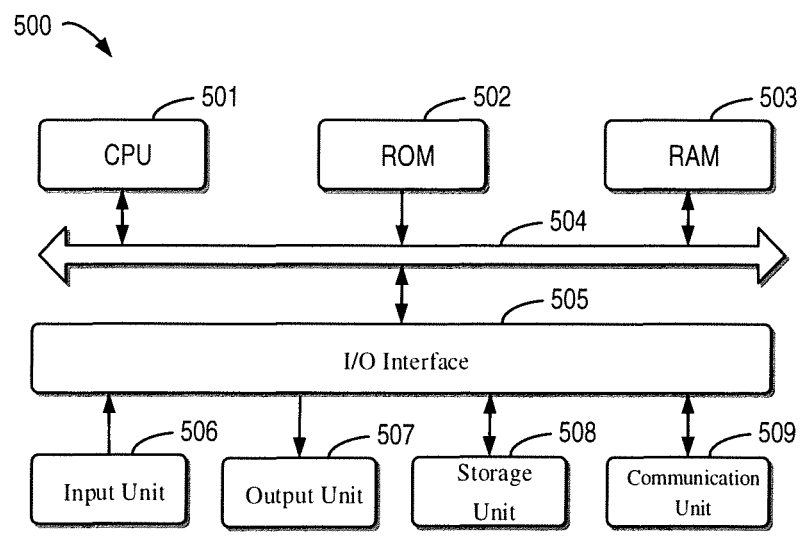
FIG. 5 illustrates a diagram showing a computing device capable of implementing the embodiments of the present disclosure.

FIG. 5 illustrates a schematic diagram showing an exemplary computing device 500 that may be used for implementing the embodiments of the present disclosure. The device 500 may be configured to implement the computing device 120 in FIG. 1. As illustrated in FIG. 5, the device 500 includes a center processing unit (CPU) 501, capable of performing various appropriate operations and processes according to computer program instructions stored in a read only memory (ROM) 502 or computer program instructions loaded from a storage unit 508 into a random access memory (RAM) 503. In the RAM 503, various programs and date necessary for the operations of the device 500 may also be stored. The CPU 501, the ROM 502, and the RAM 503 may be connected to each other via a bus 504. An input/output (I/O) interface 505 is also connected to the bus 504.

A plurality of components in the device 500 are connected to the I/O interface 505, including: an input unit 506 such as a keyboard, a mouse; an output unit 507 such as various kinds of displays, speakers; the storage unit 508 such as a magnetic disk, an optical disk; and a communication unit 509 such as a network card, a modem, a wireless communication transceiver. The communication unit 509 allows the device 500 to exchange information/data with other devices over a computer network such as the Internet and/or various telecommunication networks.

The processing unit 501 may perform the above-mentioned methods and processes, such as the methods 200 and 300. For example, in some embodiments, the methods 200 and 300 may be implemented as a computer software program, which may be tangibly contained in a machine readable medium, such as the storage unit 508. In some embodiments, a part or all of the computer program may be loaded and/or installed on the device 500 through the ROM 502 and/or the communication unit 509. When the computer program is loaded to the RAM 503 and is executed by the CPU 501, one or more steps in the methods 200 and 300 described above may be executed. Alternatively, in other embodiments, the CPU 501 may be configured to execute the methods 200 and 300 in other appropriate manners (such as, by means of firmware).

Program codes for implementing the methods of the present disclosure may be written in any combination of one or more programming languages. The program codes may be provided to a processor or a controller of a general-purpose computer, a dedicated computer or other programmable data processing devices, such that the functions/operations specified in the flowcharts and/or the block diagrams may be implemented when these program codes are executed by the processor or the controller. The program codes may be executed entirely on a machine, partially on a machine, partially on the machine as a stand-alone software package and partially on a remote machine, or entirely on a remote machine or a server.

In the context of the present disclosure, the machine-readable medium may be a tangible medium that may contain or store a program to be used by or in connection with an instruction execution system, apparatus, or device. The machine-readable medium may be a machine-readable signal medium or a machine-readable storage medium. The machine-readable medium may include, but not limited to, an electronic, magnetic, optical, electromagnetic, infrared, or semiconductor system, apparatus, or device, or any suitable combinations thereof. More specific examples of the machine-readable storage medium may include electrical connections based on one or more wires, a portable computer disk, a hard disk, a RAM, a ROM, an erasable programmable read-only memory (EPROM or flash memory), an optical fiber, a portable compact disk read-only memory (CD-ROM), an optical storage, a magnetic storage device, or any suitable combinations thereof.

In addition, although the operations are depicted in a particular order, it should be understood to require that such operations are executed in the particular order illustrated in the drawings or in a sequential order, or that all illustrated operations should be executed to achieve the desired result. Multitasking and parallel processing may be advantageous in certain circumstances. Likewise, although several specific implementation details are included in the above discussion, these should not be construed as limitation of the scope of the present disclosure. Certain features described in the context of separate embodiments may also be implemented in combination in a single implementation. On the contrary, various features described in the context of the single implementation may also be implemented in a plurality of implementations, either individually or in any suitable subcombination.

Although the subject matter has been described in language specific to structural features and/or methodological acts, it should be understood that the subject matter defined in the appended claims is not limited to the specific features or acts described above. Instead, the specific features and acts described above are merely exemplary forms of implementing the claims.

What is claimed is:

1. A computer-implemented method for generating training data in a Visual Question Answering (VQA) system, comprising:
 obtaining a first group of training data of the VQA system, the first group of training data including a first question for an image in the VQA system and a first answer corresponding to the first question;
 determining a keyword in the first question, determining an extended word associated with the keyword in term of semantic, and establishing a second question based on the extended word; and
 determining a second answer corresponding to the second question based on the first question and the first answer, to obtain a second group of training data for the image in the VQA system, the second group of training data including the second question and the second answer;
 wherein determining the second answer corresponding to the second question comprises:
 determining the second answer based on a logical relationship between the first question and the first answer, and a semantic relationship between the first question and second question.

2. The method of claim 1, wherein obtaining the first group of training data includes:
 obtaining the first group of training data from a set of existing training data that has been obtained for the VQA system by manual labeling.

3. The method of claim 1, wherein determining the second question includes:
 determining a keyword in the first question based on a type of the first question;
 determining an extended word associated with the keyword based on semantic analysis; and
 establishing the second question based on the extended word.

4. The method of claim 3, wherein determining the keyword in the first question includes:
 in response to the type of the first question being a yes-no question, extracting the keyword from the yes-no question; and
 in response to the type of the first question being a wh-question, converting the wh-question to a yes-no question based on the first question and the first answer, and extracting the keyword from the converted yes-no question.

5. The method of claim 3, wherein determining the extended word associated with the keyword includes:

in response to the keyword matched with a predetermine word in a set of predetermine words, determining an extended word of the matched predetermined word based on semantic analysis; and in response to the keyword matched with none of the predetermine words in the set of predetermined words, determining an extended word of the keyword.

6. The method of claim 5, wherein the set of predetermined words includes at least one of: numbers, letters and characters.

7. The method of claim 3, wherein the extended word includes at least one of: an antonym, a synonym, a superordinate and a hyponym.

8. The method of claim 3, wherein establishing the second question includes:

replacing the keyword in the first question with the extended word, to establish the second question.

9. An apparatus for generating training data in a Visual Question Answering (VQA) system, comprising:

one or more processors;

a non-transitory computer-readable memory for storing instructions executable by the one or more processors to cause the apparatus to perform:

obtaining a first group of training data of the VQA system, the first croup of training data including a first question for an image in the VQA system and a first answer corresponding to the first question;

determining a keyword in the first question, determining an extended word associated with the keyword in term of semantic, and establishing a second question based on the extended word; and determining a second answer corresponding to the second question based on the first question and the first answer, to obtain a second group of training data for the image in the VQA system, the second group of training data including the second question and the second answer, wherein determining the second answer corresponding to the second question comprises:

determining the second answer based on a logical relationship between the first question and the first answer, and a semantic relationship between the first question and second question.

10. The apparatus of claim 9, wherein the obtaining unit is configured to obtain the first group of training data from a set of existing training data that has been obtained for the VQA system by manual labeling.

11. The apparatus of claim 9, wherein the:

one or more processors are configured to:

determine a keyword in the first question based on a type of the first question;

determine an extended word associated with the keyword based on semantic analysis; and establish the second question based on the extended word.

12. The apparatus of claim 11, wherein the:

one or more processors are further configured, in response to the type of the first question being a yes-no question, to extract the keyword from the yes-no question; and in response to the type of the first question being a wh-question, to convert the wh-question to a yes-no question based on the first question and the first answer, and to extract the keyword from the converted yes-no question.

13. The apparatus of claim 11, wherein the one or more processors are configured, in response to the keyword matched with a predetermine word in a set of predetermine words, to determine an extended word of the matched predetermine word based on semantic analysis; and in response to the keyword matched with none of the predetermine words in the set of predetermine words, to determine an extended word of the keyword.

14. The apparatus of claim 13, wherein the set of predetermined words includes at least one of: numbers, letters and characters.

15. The apparatus of claim 11, wherein the extended word includes at least one of: an antonym, a synonym, a superordinate and a hyponym.

16. The apparatus of claim 11, wherein the one or more processors are configured to replace the keyword in the first question with the extended word, to establish the second question.

17. A non-transitory computer readable storage medium having a computer program stored thereon, wherein, when the program is executed by a processor, the program implements a method for generating training data in a Visual Question Answering (VQA) system, comprising:

obtaining a first group of training data of the VQA system, the first group of training data including a first question for an image in the VQA system and a first answer corresponding to the first question;

determining a keyword in the first question, determining an extended word associated with the keyword in term of semantic, and establishing a second question based on the extended word; and determining a second answer corresponding to the second question based on the first question and the first answer, to obtain a second group of training data for the image in the VQA system, the second group of training data including the second question and the second answer, wherein determining the second answer corresponding to the second question comprises:

determining the second answer based on a logical relationship between the first question and the first answer, and a semantic relationship between the first question and second question.

* * * * *